3,141,001
CORROSION INHIBITING COMPOSITIONS
Mel L. Vietor, Stillwater, Minn., assignor to Minnesota
Mining and Manufacturing Company, St. Paul, Minn.,
a corporation of Delaware
No Drawing. Filed Mar. 31, 1961, Ser. No. 99,685
2 Claims. (Cl. 252—389)

This invention relates to corrosion and scaling inhibitors and to methods for their use. In one aspect this invention relates to a fluorochemical containing composition for inhibiting corrosion and scaling of steel and other metals in contact with water.

The problem of controlling the corrosion and scaling of metals, particularly when in contact with water, has been of sufficient importance and magnitude to encourage extensive investigation of the possible mechanisms involved. Various methods, such as pH control, use of phosphates or chromates, addition of ammonia or amines, etc. have been proposed and explored, particularly in reference to the treatment of boiler water, cooling water and condensate. In cooling towers, for example, treatment for scale prevention and bacteriological control is almost of equal importance to corrosion prevention. Chromates and/or polyphosphates are commonly employed. In condensate corrosion volatile neutralizing amines have been used as inhibitors. Although the inhibitors employed are generally selected specifically for a particular type of system, they have generally been used in significant concentrations to achieve the desired results. A highly efficient corrosion inhibiting composition that is effective at significantly lower concentration levels and which further decreases the corrosion rate, particularly with steel, has been needed.

It is therefore an object of this invention to provide a new corrosion inhibiting composition.

Another object of this invention is to provide a corrosion and scaling inhibiting composition for use in aqueous media.

A further object of this invention is to provide a corrosion inhibiting composition which is effective at very low concentration levels.

Yet another object of this invention is to provide an improved method for inhibiting corrosion and scaling of metals, especially steel.

According to this invention, the unique corrosion and scaling inhibiting composition comprises an inorganic chromate, particularly alkali and alkaline earth chromates and a highly fluorinated sulfonic acid or salt thereof. Such compositions may be provided as a dry solids admixture or as a concentrated aqueous solution, in which form they may subsequently be further diluted with water for use in boilers, heat exchangers, cooling towers, etc., as hereinafter described.

Although the inorganic chromates as well as the carbonates, phosphates and silicates have long been identified as corrosion inhibitors, it has been found that the compositions of this invention require the use of a water soluble chromate in order to obtain the improved results. "Chromate" as used herein includes those chromate or dichromate radicals containing hexavalent chromium, as particularly exemplified by the alkaline and alkaline earth chromates and dichromates, e.g., sodium chromate, sodium dichromate, potassium chromate, potassium dichromate. When such chromates are employed for corrosion protection in aqueous systems, e.g., open and closed recirculating cooling water systems, as much as 200–300 p.p.m. are often needed to obtain satisfactory control. In closed recirculating systems higher concentrations are preferred, e.g., 1000–2000 p.p.m. Frequently the chromates are used in adjunct to the inorganic phosphates, particularly when calcium carbonate precipitation is a serious problem. It is therefore possible to include such soluble phosphates, and polyphosphates in the corrosion inhibiting composition of this invention. The further incorporation of buffering compounds, pH control agents, and other additives assisting in the prevention of effects such as tuberculation, pitting, discoloration, slime control, precipitation, and the like may also be desirable in certain environments.

The highly fluorinated sulfonic acids have the formula $$RSO_3H$$

where R is a saturated fluorocarbon radical having from 1 to about 18 carbon atoms, preferably from 3 to 12 carbon atoms, and having at least 50 percent fluorine substitution, the remaining substituents being hydrogen. In the preferred embodiment R is an aliphatic $C_nF_{2n+1}$ or a cycloaliphatic $C_nF_{2n-1}$, where $n$ is an integer from 1 to 18, preferably 3 to 12. R may include a branched or straight chain. Illustrative of these compounds are perfluoroethanesulfonic acid, perfluoro-n-pentanesulfonic acid, trifluoromethane sulfonic acid, perfluoro-n-hexanesulfonic acid, perfluoro-n-octanesulfonic acid, perfluoro-(cyclohexyl-methane) sulfonic acid, perfluoro-(4-methylcyclohexane) sulfonic acid, perfluorocyclohexanesulfonic acid, perfluoro (2-methylcyclohexane) sulfonic acid, perfluoro (4-ethylcyclohexane) sulfonic acid, perfluoro (4-isopropylcyclohexane) sulfonic acid, perfluoro (4-sec-butylcyclohexane) sulfonic acid, perfluoro-(4-dodecylcyclohexane) sulfonic acid, and perfluoro-(cyclohexyl-ethane) sulfonic acid. These acids and their corresponding metal and ammonium salts, along with their preparation, are described in U.S. Patent 2,732,398. Usually the metal and ammonium salts of these fluorinated sulfonic acids are preferred, particularly the alkali and alkaline earth salts, e.g., sodium, potassium, etc.

In these corrosion inhibiting compositions the weight ratio of chromate to fluorinated sulfonic acid derivatives may be varied from about 1000:1 to about 1:5 preferably from about 100:1 to about 1:2. In aqueous systems the chromate concentration ranges from about 10 to about 1000 p.p.m., preferably from about 10 to about 100 p.p.m., whereas the fluorinated sulfonic acid derivative is present in a concentration from about 1 to about 50 p.p.m., preferably from 1 to about 20 p.p.m. Because the corrosion inhibiting properties of these compositions are outstanding at such low levels of concentration, the amount of chromate required in the system to achieve a given corrosion rate, measured in mils per year, can be significantly reduced. Lower chromate levels are desirable, since the higher chromate concentrations adversely affect many types of commonly used gaskets and pump seals. Moreover, the fluorinated sulfonic acid derivatives not only permit lower chromate levels but also serve both to improve the lubricity of the system, further enhancing the useful life of such components as centrifuged pump impellors and other moving parts, and to reduce pitting and tuberculation.

The inhibiting compositions of this invention can be used over a wide pH range pH 3–10, preferably pH 6–10.

With steel it is also noteworthy that these compositions reduce the tendency toward scaling which frequently occurs at high pH values, particularly at elevated temperatures with relatively high levels of inorganic salts, e.g., calcium salts, in the system. Other corrosion inhibitors, such as polyphosphates, phosphates, silicates, etc., may be included if desired.

The systems in which these corrosion inhibiting compositions are employed may be subjected to the various known pretreatments to clean the metal surface or to further improve the corrosion resistance. For example, phosphate coatings on the metal surfaces, as distinguished from metallic or paint coatings, are provided by the well known parkerizing and bonderizing processes. The most commonly used coating solutions contain zinc and iron, or manganese and iron phosphates which react with the metal surfaces to form a crystalline phosphate coating. An oxidizing agent is usually added to accelerate formation of the coating, as described in U.S. Patent 1,911,726. Other phosphating or phosphatizing solutions have been sprayed onto surfaces which cannot readily be immersed or flooded. Before such pretreatment steps the metal surfaces are generally cleaned with phosphoric acid and other metal cleaners.

In testing the effect of these inhibitor compositions on corrosion of steel, metal coupons and Corrosometer probes were utilized in a Corrosometer apparatus (Crest Instrument Co.). The test procedure was similar to that of Bregman and Newman, Corrosion 15, 97+ (1959). Temperature in the aerated aqueous bath was maintained at 140° F. ±1° F. Water was added intermittently to make up evaporation losses in an open recirculating system and to simulate "blowdown." The synthetic cooling water contained: 100–150 p.p.m. chloride ion; 55–80 p.p.m. sulfur as sulfate ion; 10 p.p.m. chlorine; 50–75 p.p.m. calcium ion; 14–20 p.p.m. magnesium ion; 55–80 p.p.m. sodium and potassium ion and carbon dioxide saturation. Constant and equal agitation was maintained in each vessel. Flow rate past the immersed probes was two feet per second. Measurement of corrosion rate in mils per year was made by determining the change in resistance of mild steel probes over the test period. Illustrative data appears in Table I. Average corrosion rate was calculated over the entire run after an initial 10–12 hours had elapsed. Terminal corrosion rate was determined over the last 8–10 hours of the run. The pH was 6.5–7.0.

*Table I*

| Run | Test Period | Inhibitor | Corrosion Rate in mils/year | |
|---|---|---|---|---|
| | | | Average | Terminal |
| 1 | 6 days | 15 p.p.m. Na₂CrO₄ | 8.4 | 4.7 |
| 2 | 14 days | 15 p.p.m. Na₂CrO₄ | 4.6 | 4.2 |
| 3 | 14 days | 60 p.p.m. Na₂CrO₄ | 2.6 | 1.9 |
| 4 | 6 days | 15 p.p.m. Na₂CrO₄+10 p.p.m. C₈F₁₇SO₃K | 1.7 | 0.8 |
| 5 | 6 days | 10 p.p.m. C₈F₁₇SO₃K | 22–23 | 25 |
| 6 | 6 days | None | 25+ | 35+ |
| 7 | 54 hours | 7.5 p.p.m. Na₂CrO₄+5 p.p.m. C₈F₁₇SO₃K | 9.8 | |
| 8 | 54 hours | 15 p.p.m. Na₂CrO₄ | 12.3 | |
| 9 | 54 hours | 10 p.p.m. C₈F₁₇SO₃K | 22.4 | |
| 10 [1] | 8 days | 15 p.p.m. Na₂CrO₄ | 18.3 | 18.3 |
| 11 [1] | 8 days | 15 p.p.m. Na₂CrO₄+10 p.p.m. C₈F₁₇SO₃K | 2.0 | 1.05 |
| 12 | 54 hours | 15 p.p.m. Na₂CrO₄+10 p.p.m. iso-C₃F₇–C₆F₄–SO₃K | 1.8 | |
| 13 | 57.5 hours | 15 p.p.m. Na₂CrO₄+10 p.p.m. C₆F₄–CF₂SO₃K | 2.6 | |

[1] Intermittent agitation.

Although the fluorinated sulfonic acid derivatives are not outstanding corrosion inhibitors when used alone, their use in combination with an inorganic chromate produced a marked reduction in the corrosion rate compared to the standard chromate systems at similar concentration levels. Moreover, the corresponding chromate levels can be reduced by 50% or more in the presence of minor quantities of the fluorinated sulfonic acid derivatives. Similar results may be achieved with the other fluorinated sulfonic acid derivatives mentioned earlier.

A field test under actual operating conditions was performed in a 2500 gallon cooling system for an industrial refrigeration cooling tower condenser. Blowdown was eliminated during treatment with fluorinated sulfonic acid derivatives. Average water temperature was 78° F. Table II sets forth corrosion results.

*Table II*

| | Inhibitor | Period, weeks | Corrosion Rate (mils/year) |
|---|---|---|---|
| 14 | 50 p.p.m. Na₂CrO₄ | 1 | 8.2 |
| 15 | 100 p.p.m. Na₂CrO₄ | 1 | 4.6 |
| 16 | 300 p.p.m. Na₂CrO₄ | 1 | 3.6 |
| 17 | 15 p.p.m. Na₂CrO₄ continuous (60 p.p.m. Na₂CrO₄ initial) | 2 | 3.5 |
| 18 | 15 p.p.m. Na₂CrO₄+10 p.p.m. C₈F₁₇SO₃K | 3 | 1.2 |

Water analysis indicated 10–16 cycles of concentration, but inspection of the system revealed no scaling or other sediment deposits after extended use of the inhibitors of this invention. According to the Saturation Index (or Langelier Index) the water at the conclusion of the test had an index value of 4.8, using a 130° F. temperature of the condenser wall. Since water with an index value below 6 generally causes scaling, the clean system and absence of scaling even at a low index of 4.8 was significant. The interior surface of the piping and the condenser had only a thin film of loosely adherent powder which could easily be removed with the finger. No evidence of a corrosion problem or of tuberculation was found, and the settled solids or sludge was much less than occurred during ordinary operation of the system. The presence of the fluorocarbon sulfonic acid also served to maintain a high degree of water clarification during this period.

Frequently, corrosion rates cycle or rise abruptly during the operation of a recirculating system, and such loss of "control" is not only costly but also troublesome to overcome. During all tests with the corrosion inhibiting composition of this invention, no cycling was noted, even without careful maintenance of a constant concentration level of the fluorinated sulfonic acid derivative or of a constant pH. In all runs, the reported concentration of these fluorinated derivatives indicates the initial concentration, and no replenishment was made during the extended runs. Chromate was generally held at the initial value throughout the run. This provided an indication that the level of fluorinated sulfonic acid derivative can be permitted to drop markedly over an extended period of operation without loss of inhibition or of control, thereby effecting further operating economy.

The inhibiting compositions herein described may be provided as a simple admixture of the respective constituents, as an aqueous concentrate, or as a dilute aqueous solution thereof. As mentioned earlier, other corrosion inhibitors, including both inorganic and organic inhibitors, lubricants, wetting agents, etc. may be incorporated into the compositions of this invention.

The specific embodiments set forth above are intended to illustrate the invention and not to limit its scope as otherwise disclosed herein. Various other modifications of the present invention will be apparent to those skilled in the art without departing from the scope thereof.

I claim:

1. A corrosion inhibiting composition which consists essentially of about 15 parts by weight of a water soluble inorganic chromate and about 10 parts by weight of a saturated fluorinated organic compound of the formula $$R_fSO_3H$$

wherein $R_f$ is selected from the group consisting of aliphatic $C_nF_{2n+1}$ and cycloaliphatic $C_nF_{2n-1}$ and $n$ is an integer from 1 to 18, and the metal and ammonium salts thereof.

2. The corrosion inhibiting composition of claim 1 wherein $R_f$ is $C_8F_{17}$.

References Cited in the file of this patent
UNITED STATES PATENTS

| | | |
|---|---|---|
| 2,662,835 | Reid | Dec. 15, 1953 |
| 2,711,391 | Kahlev | June 21, 1955 |
| 2,732,398 | Brice et al. | Jan. 24, 1956 |
| 2,793,932 | Kahler et al. | May 28, 1957 |
| 2,956,956 | Strauss et al. | Oct. 18, 1960 |